United States Patent [19]

Lenoir

[11] 3,972,318
[45] Aug. 3, 1976

[54] UTENSIL FOR OVEN COOKING

[76] Inventor: Jacques, Antonine Lenoir, 1 bis, Allee de Quebec, Massy (Essonne), France

[22] Filed: Apr. 10, 1974

[21] Appl. No.: 459,619

[30] Foreign Application Priority Data

Sept. 5, 1973  France .............................. 73.31951

[52] U.S. Cl. ............................... 126/348; 126/369; 99/400; 99/413; 99/446
[51] Int. Cl.² ........................................ F24H 1/22
[58] Field of Search ............ 99/446, 413, 400, 450; 126/369, 348, 393.2; 220/13, 17

[56] References Cited
UNITED STATES PATENTS

| | | | |
|---|---|---|---|
| 527,252 | 10/1894 | Stroud | 126/369 |
| 812,590 | 2/1906 | Obermann | 126/369 |
| 1,263,004 | 4/1918 | Tollagsen | 126/369 |
| 1,650,634 | 11/1927 | Lutzler | 99/446 |
| 1,740,205 | 12/1929 | Schmidt | 99/446 |
| 1,934,125 | 11/1933 | Hurt | 99/446 |
| 3,248,518 | 4/1966 | Ogle, Jr. et al. | 99/446 |
| 3,289,571 | 12/1966 | Lewus | 126/369 |
| 3,453,949 | 7/1969 | Levin | 99/446 |
| 3,640,209 | 2/1972 | Wilson | 99/446 |

Primary Examiner—Kenneth W. Sprague
Assistant Examiner—Larry I. Schwartz
Attorney, Agent, or Firm—Murray Schaffer

[57] ABSTRACT

The invention relates to a utensil for cooking foods, more particularly meat in the oven in a humid atmosphere and preventing fat being splashed onto the oven walls. This can involve cooking joints of meat remaining stationary on a supporting grill or cooking pieces of meat by infra-red radiation.

The cooking utensil comprises a box having a base serving as a water container and a collector for cooking fat and gravy, provided with a lid having at least a hole, whereby the box and lid are associated with a frame for assembling them and clamping them together and for supporting a support for the joints to be cooked.

14 Claims, 5 Drawing Figures

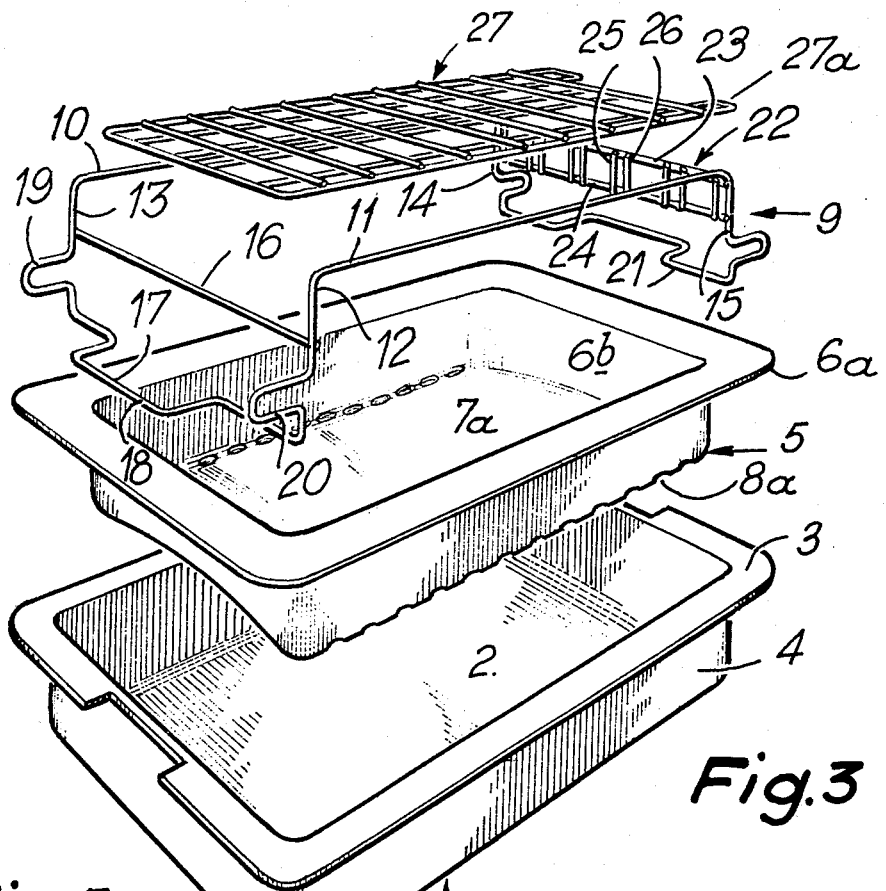
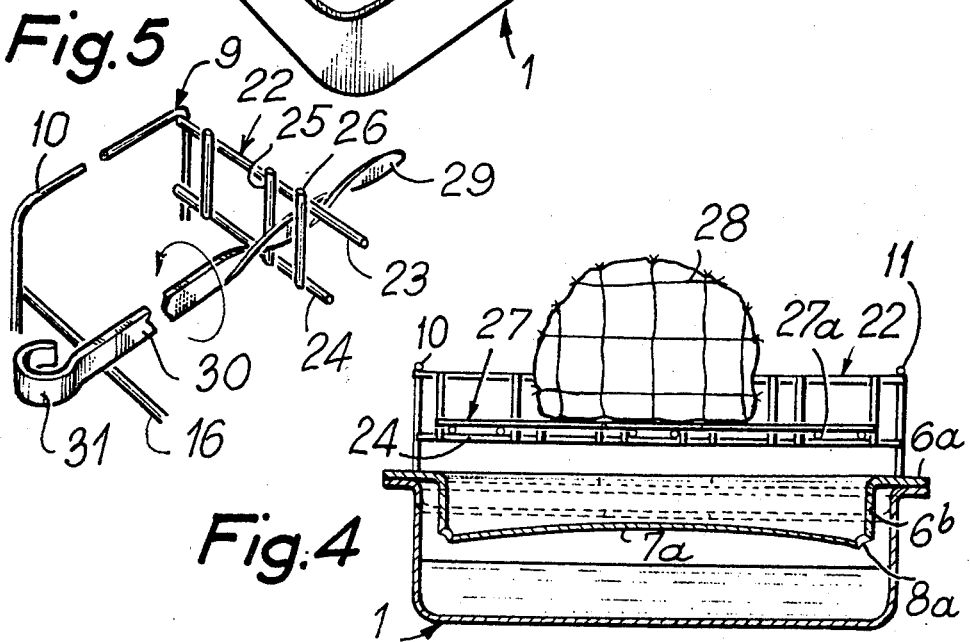
Fig. 3
Fig. 5
Fig. 4

UTENSIL FOR OVEN COOKING

BACKGROUND OF THE INVENTION

The invention relates to a pair of combinable dishes for cooking foods, such as meat and the like in the oven. The upper dish comprises a bottom plate, a grill being provided serving to raise the joint to be roasted relative to the said upper dish.

Utensils of this type comprise a grill or equivalent perforated plate resting on the dish or the bottom plate with the object of preventing the roasting joint from being immersed in the cooking gravy and fat.

Utensils of this type cannot give satisfactory results. It is impossible to prevent fat from splashing onto the walls of the oven. The joint being roasted must be periodically moistened or sprinkled with the gravy in the dish to prevent its surface from burning. The fat is exposed to the direct radiant heat of the oven and is liable to a temperature rise which can impair its quality and flavor. The gravy is evaporated in an uncontrolled manner which is also disadvantageous.

The main object of the invention is to obviate these disadvantages.

The basic object of the invention is to obtain a better cooking action without any intervention being necessary during the cooking process.

It also aims at preventing fat from being splashed onto the oven walls during cooking.

In addition, it aims at retaining the taste and quality of the cooking gravy and fat.

It finally has for its object the control of evaporation into the oven atmosphere, thus maintaining in the oven an atmosphere which is continuously laden with water vapour leading to an acceleration of caramelisation of the surface of the joint preventing the loss of water within the joint which is being roasted.

SUMMARY OF THE INVENTION

The invention therefore comprises a utensil forming a combination of a pair of dishes for cooking in an oven consisting of, in combination, a lower dish on which is placed a upper dish provided with at least one calibrated hole. There are provided for securing the upper dish on the lower dish and supporting means on the securing means for a support adapted to receive at least one joint for roasting or broiling.

According to a special embodiment said support comprises a detachable grill and said supporting means are formed as a detachable frame shaped and dimensioned to be engageable with said dishes, in which frame by crossbars are provided and shaped uprights. The grill and frame are made of a metal wire. The frame has fixing loops shaped to clamp together the mating edges of the said lower and upper dish.

According to another embodiment at least one of the said crossbars comprises two superposed parallel rods joined together by a plurality of pins between which engages a corkscrew-shaped point of a corresponding spit for spit roasting. The head of the spit thus rests on the other facing bar so that the rotation of the spit is controlled by slight forward movements and the spits form a plurality of supports.

According to a first configuration the second dish can have a flat base with parallel rows of holes of small individual size.

According to the preferred configuration the upper dish has a curved base, convex bottom when viewed from above and at least one hole is arranged in the deepest point of the convexity or may be provided two rows of holes running between the longitudinal sides of said convex bottom.

Advantageously the securing means are provided with folded down portions which form grips, permitting their assembly and disassembly relative to the associated dishes and clamping the same together on their flanged edges.

Advantageously, the meat supporting grill a head is provided with a head having folds having between the pairs of crossbar pins to ensure in one direction the longitudinal positioning of the grill on a support and to secure the grill against transverse shifts.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the scope of the appended claims.

BRIEF DESCRIPTION OF THE DRAWINGS

FIG. 3 shows a variant in analogous manner to FIG. 1.

FIG. 4 shows in cross-section the variant of FIG. 3 in analogous manner to FIG. 2.

FIG. 5 shows in part an assembly diagram for the spits.

DESCRIPTION OF THE PREFERRED EMBODIMENTS

Figure 1:
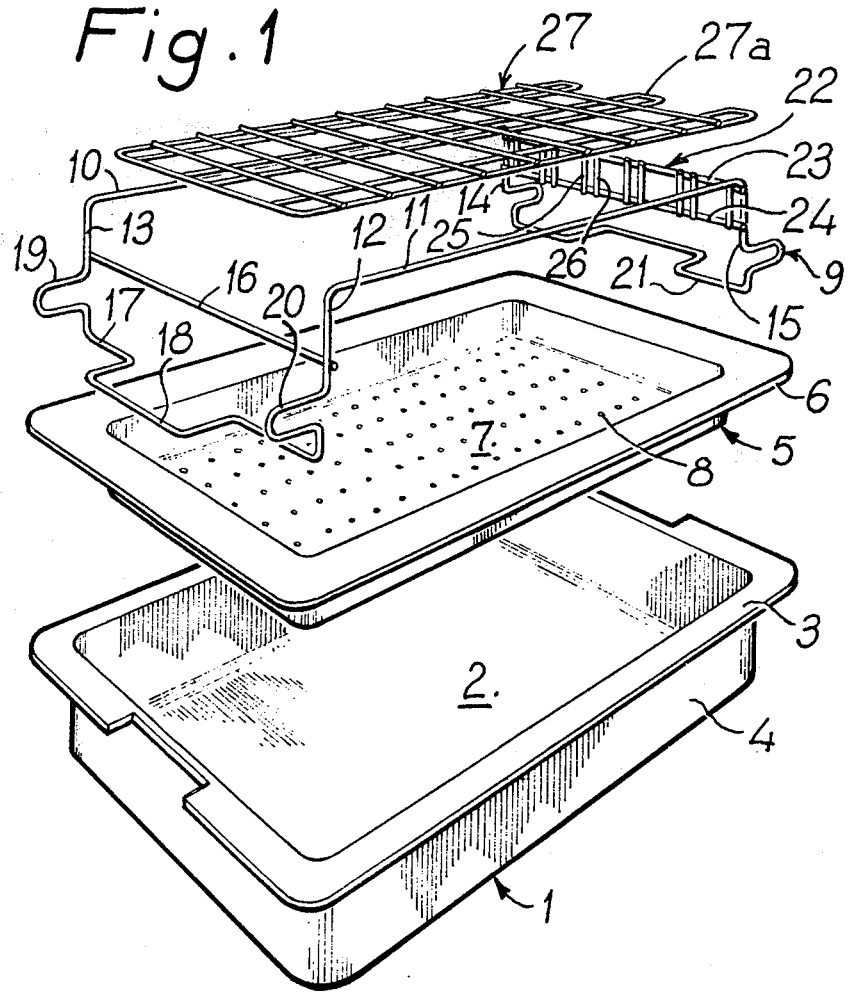
FIG. 1 shows in an exploded perspective view all the components of such a combined dish according to a first embodiment.

As shown in FIG. 1 the utensil comprises a first rectangular hollow dish 1, having a base 2 and an edge 3 folded towards the outside relative to the raised frame 4 of base 2.

A second dish 5 of the same configuration but shallower can be inserted in the first dish 1 and its folded-down edge 6 rests on the edge 3 of the first dish. Base 7 of dish 5 has rows of holes 8 of small individual size.

Dish 1 and dish 5 are assembled by means of an elastic wire frame 9 having a pair of side members 10, 11 bent and integral with uprights 12, 13, 14, 15. Uprights 12, 13 are joined together by a crossbar 16 forming a first supporting bar and by a second underlying crossbar 17 in whose central portion a bent-out section forms a grip. Uprights 12, 13 have between bar 16 and crossbar 17 loops 19, 20 for fixing on the corresponding sides of mating edges 3 and 6.

The opposite pair of uprights 14, 15 has the same shape and lower crossbar 21 is identical to crossbar 17. However, intermediate crossbar 22, identical to crossbar 16, is formed by a pair of parallel bars 23, 24 joined together by regularly spaced pairs of parallel pins 25, 26.

Figure 2:
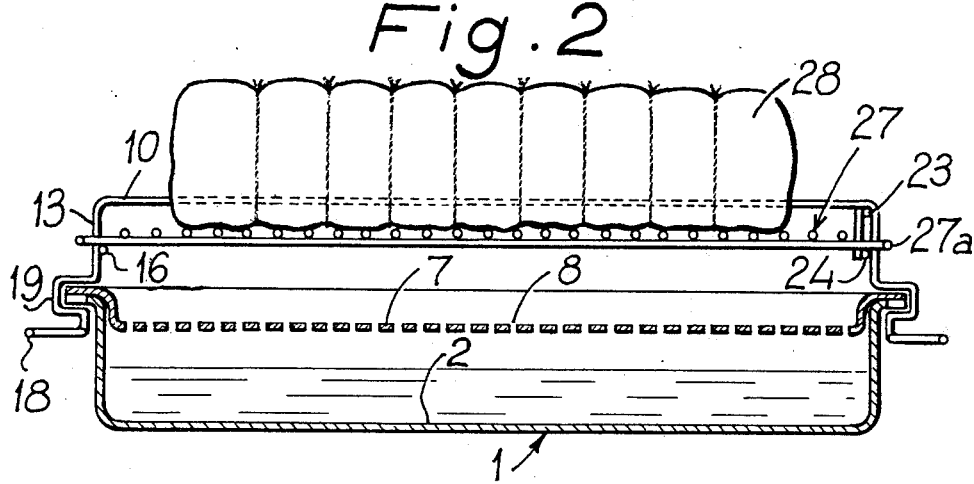
FIG. 2 shows a corresponding longitudinal section in the assembled state of the components forming the combined dish.

The shape of a grill 27 made from metal wires joined together to form a net structure by welds at the intersection points is adapted to that of frame 9, which simultaneously in combined manner serves as the means for maintaining the first and second dishes in the assembled state and as the means for supporting the support of the roasting joint 28 (FIG. 2), said support being formed by said grill 27. The bending of the wires of grill 27 forming side members offers heads 27a which engage between pairs of pins 25, 26. Alternatively by eliminating grill 27 inside each pair can be engaged the corkscrew-shaped point 29 (FIG. 5) of a spit 30 whereof the grip 31 can rest on the opposite crossbar 16. The controlled rotation of this spit results from the nut action of the pair of pins relative to the flat corkscrew-shaped body of spit 30 when the latter is progressively moved in stages in the direction of its length.

The variant of FIGS. 3 and 4 differs from that of the first embodiment in that the second dish 5a has a cylindrically convex bottom 7a and at the junctions between base 7a and sides 6b linking the bottom 7a to flanged edges 6a two rows of holes 8a, which are therefore located in the lowest portions of the bottom 7a.

Thus a combined dish arrangement is provided for roasting or spit-roasting meat. The lower dish may contain a water reserve adapted to the extent and duration of the planned cooking-operation. Thus collection is made of fat and of fluid draining from the joint being cooked and the meat exudates are placed in reserve and protected from above by the upper dish, so that the joint's quality and flavor are preserved. Moreover, this reserve of water evaporating in the oven ensures the presence in the utensil of humid atmosphere favourable to good cooking conditions and more particularly contributing to the surface caramelisation of the joint. Thus, in two ways the water loss which the joint would otherwise undergo during cooking is prevented.

The variant of FIGS. 3 and 4 improves both the protection and the conditions for the collection and drainage of fat and gravy from the joint being cooked, whilst the danger of deterioration is reduced by reducing the possible stagnation time of the fat and gravy on the upper surface of the base of the upper dish.

While there has been described and illustrated the preferred embodiments of the invention, it is to be understood that these are capable of variation and modification, and it is therefore not desired to be limited to the precise details set forth, but to include such modifications and alterations as fall within the scope of the appended claims.

What is claimed is:

1. A utensil for oven roasting and broiling of foods comprising in combination superimposed upper and lower conformingly shaped dishes, and means for supporting the food above said upper dish during roasting or broiling, said lower dish being adapted to retain fluids, said upper dish having at least one hole formed in its bottom for the passage of fats and fluids from said food into said lower dish and for the passage of moisture outwardly from said lower dish about said food, each of said dishes having a peripheral side wall terminating in an outwardly flanged edge, the flanged edge of said upper dish mating with the flanged edge of said lower dish, clamping means engaging about at least a portion of said flanged edges for securing said superimposed dishes closed about their periphery.

2. The utensil according to claim 1 wherein the upper dish has a flat bottom and is provided with a plurality of rows of holes.

3. The utensil according to claim 1 wherein said upper dish has a convex bottom and is provided with a plurality of holes located at the lowest points of convexity.

4. A utensil for oven roasting and broiling of foods comprising in combination superimposed upper and lower conformingly shaped dishes, and means for supporting the food above said upper dish during roasting or broiling, said lower dish being adapted to retain fluids, said upper dish having at least one hole formed in its bottom for the passage of fats and fluids from said food into said lower dish and for the passage of moisture outwardly from said lower dish about said food, said upper and lower dishes having peripheral side walls terminating in mating outwardly flanged edges, including means for removable securing said superimposed dishes, comprising a wire frame having two large inverted U-shaped stringers the smaller limbs of which are provided on each side of said utensil with loops adapted to press and hold together the flanged edges of said dishes in assembled configuration, the small limbs at each side of said utensil being joined by at least two vertically superimposed cross members, the upper cross member being adapted to be located above the level of said flanges to provide rest for said food supporting means, the lower one of said cross members being located below the level of said flanges and being bent to constitute handles.

5. The utensil according to claim 4 in which one of said upper cross members is made of two pieces of wire spaced parallel to each other and joined vertically by spaced pins.

6. The utensil according to claim 4 in which said food supporting means comprises a grid of light wire.

7. The utensil according to claim 5 in which said vertical pins joining said wires of said upper cross member are spaced in paired relationship to form a series of narrow vertical catches.

8. The utensil according to claim 7 in which said food supporting means comprises a plurality of skewers, each having a sharp end and a 360° twist therein, said skewers engaging within said vertically paired pins and having a handle at the opposite end resting on said opposite cross bar.

9. The utensil according to claim 5 in which said grid has a width less than the distance between said stringers and a length greater than the distance between said upper cross bars such that it may rest on said cross bars.

10. The utensil according to claim 9 in which one end of said grid is formed with spaced loops shaped to engage within said catches.

11. The utensil according to claim 4 wherein said upper dish has a convex bottom and is provided with a plurality of holes located at the lowest points of convexity.

12. A utensil for oven roasting and broiling of foods, comprising in combination superimposed upper and lower conformingly shaped dishes, and means for supporting the food spaced above said upper dish during roasting or broiling, said lower dish being adapted to retain fluids, said upper dish being supported within said lower dish so that its bottom is spaced from the bottom of said lower dish, and having a convex bottom extending in cross-section between opposite walls thereof, the lowest point of said bottom being along the marginal edge adjacent said opposite walls, each of said marginal edges being provided with at least one hole for the passage of fats and fluid from said food into said lower dish about said food.

13. The utensil according to claim 12 wherein each of said dishes has peripheral side walls terminating in an outwardly flanged edge, the flanged edge of said upper dish peripherally covering and matingly engaging the flanged edge of said lower dish and means for clamping said dishes in mating engagement.

14. The utensil according to claim 12 whereby said means for supporting the food comprises a wire grid being in extent less than the distance between the marginal edges.

* * * * *